US011887439B2

(12) United States Patent
Santisi et al.

(10) Patent No.: US 11,887,439 B2
(45) Date of Patent: Jan. 30, 2024

(54) GAMING SYSTEM PROVIDING GROUP-BASED AWARDS

(71) Applicant: Aristocrat Technologies Inc., Las Vegas, NV (US)

(72) Inventors: Steven Santisi, Las Vegas, NV (US); T. Grant Bolling, Jr., Maryland Heights, MO (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 145 days.

(21) Appl. No.: 17/039,548

(22) Filed: Sep. 30, 2020

(65) Prior Publication Data

US 2022/0101693 A1 Mar. 31, 2022

(51) Int. Cl.

*G07F 17/00* (2006.01)
*G07F 17/32* (2006.01)
*G07F 17/34* (2006.01)

(52) U.S. Cl.

CPC ...... *G07F 17/3274* (2013.01); *G07F 17/3225* (2013.01); *G07F 17/3258* (2013.01); *G07F 17/3267* (2013.01); *G07F 17/3213* (2013.01); *G07F 17/3239* (2013.01); *G07F 17/3276* (2013.01); *G07F 17/34* (2013.01)

(58) Field of Classification Search

None

See application file for complete search history.

(56) References Cited

U.S. PATENT DOCUMENTS 8,500,548 B2 8/2013 Baerlocher et al.
9,390,585 B2 7/2016 Nelson et al.
2003/0224852 A1* 12/2003 Walker ................ G07F 17/3276 463/20
2008/0102916 A1* 5/2008 Kovacs ............... G07F 17/3216 463/16
2009/0124327 A1* 5/2009 Caputo ............... G07F 17/3255 463/20
2010/0262476 A1* 10/2010 Amour ................ G07F 17/3258 705/14.14
2013/0084975 A1* 4/2013 Erickson ............. G07F 17/3225 463/29
2013/0252720 A1* 9/2013 Milligan ............. G07F 17/3246 463/27
2013/0260868 A1* 10/2013 Caputo ............... G07F 17/3211 463/25
2013/0331184 A1* 12/2013 Kelly .................. G07F 17/3211 463/31

(Continued)

*Primary Examiner* — James S. McClellan
*Assistant Examiner* — Jeffrey K Wong
(74) *Attorney, Agent, or Firm* — Armstrong Teasdale LLP

(57) ABSTRACT

Innovations in game design features of an electronic gaming device are presented. Groups of players can be defined that may win an award that is also available to non-group based players. If the award is won by a group-based player, the award can be distributed to at least a portion of the group members in addition to the player who won the award. A group profile can define criteria for group membership, awards associated with the group, how awards will be distributed among the group, and how and when groups can be altered. Groups can be associated with awards other than those associated with gaming activity. In addition, a value of a gaming award can be increased based on non-gaming activity.

20 Claims, 13 Drawing Sheets

(56) References Cited

U.S. PATENT DOCUMENTS

| | | | | |
|---|---|---|---|---|
| 2014/0162761 | A1* | 6/2014 | Crivelli | G07F 17/34<br>463/25 |
| 2015/0221175 | A1* | 8/2015 | Czubak | G07F 17/3258<br>463/22 |
| 2017/0358175 | A1* | 12/2017 | Zimmerman | G07F 17/3255 |
| 2020/0265683 | A1* | 8/2020 | Yi | G07F 17/3272 |

* cited by examiner

GAMING SYSTEM PROVIDING GROUP-BASED AWARDS

TECHNICAL FIELD

The present disclosure generally relates to electronic gaming. Particular embodiments provide systems and methods for sharing an award won by a member of a group with other group members.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Many EGMs include jackpots, which typically are infrequently occurring, relatively high value awards. Some jackpots have fixed values, while other jackpots can have values that increase, which can be referred to as progressive jackpots. For example, a portion of wagers placed on an EGM may be allocated to the progressive jackpot. Progressive jackpots can be linked to game play on multiple EGMs, which can be referred to as linked progressive jackpots. In many cases, a separate progressive system server is used to manage linked progressive jackpots. Individual EGMs can be connected to the progressive system server.

Progressive jackpots can optionally be configured to have minimum or maximum values. When a progressive jackpot is awarded, the value of the progressive jackpot typically is changed to a lower amount, which can be referred to as a reset amount.

An EGM can be associated with multiple jackpots, which can be awarded based on different RNG outcomes, and can be configured differently. For example, an EGM may be configured to accept wagers in discrete amounts or ranges, where each amount or range is designated as a certain level or tier. Some jackpots may only be associated with a subset of the levels. For example, a minimum wager amount may be required before a given jackpot is made available as potential game outcome.

Typical awards for an EGM, including jackpots of a fixed value or progressive jackpots, are only available to be won by individual players. Thus, game play can be more isolating for a player than if players were allowed to try and win an award as part of a group. In addition, providing awards based on individual game play that are distributed to only the winning player can provide players with fewer opportunities to win an award. Accordingly, room for improvement exists.

SUMMARY

In one aspect, an electronic gaming system is provided that includes an electronic gaming machine configured to present a wagering game. First wagers are received for a first plurality of group-based players. The first wagers are associated with game play of a wagering game that provides a chance to receive at least a first award. The first plurality of players is associated with a group definition.

Second wagers are received for a second plurality of non-group-based players. The second wagers are associated with game play of the wagering game that provides a chance to be awarded the at least a first award.

It is determined that a game outcome for a game instance of the wagering game played by a first player of the plurality of players includes conferral of the at least a first award. The at least a first award is distributed to multiple players of the first plurality of players.

In a further aspect, the present disclosure provides a method for allocating portions of an award for game play on one or more electronic gaming machines to members of a group. First wagers are received for a first plurality of group-based players. The first wagers are associated with game play of a wagering game that provides a chance to receive at least a first award. The first plurality of players is associated with a group definition.

Second wagers are received for a second plurality of non-group-based players. The second wagers are associated with game play of the wagering game that provides a chance to be awarded the at least a first award.

It is determined that a game outcome for a game instance of the wagering game played by a first player of the plurality of players includes conferral of the at least a first award. The at least a first award is distributed to multiple players of the first plurality of players.

In a further aspect, one or more computer-readable storage media are provided that store instructions that, when executed by a computing device, cause the computing device to perform operations for allocating portions of an award for game play on one or more electronic gaming machines to a members of a group. First wagers are received for a first plurality of group-based players. The first wagers are associated with game play of a wagering game that provides a chance to receive at least a first award. The first plurality of players is associated with a group definition.

Second wagers are received for a second plurality of non-group-based players. The second wagers are associated with game play of the wagering game that provides a chance to be awarded the at least a first award.

It is determined that a game outcome for a game instance of the wagering game played by a first player of the plurality of players includes conferral of the at least a first award. The at least a first award is distributed to multiple players of the first plurality of players.

Disclosed innovations can be implemented as part of a method, as part of an electronic gaming device such as an EGM or electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

DETAILED DESCRIPTION

Overview

Figure 1:
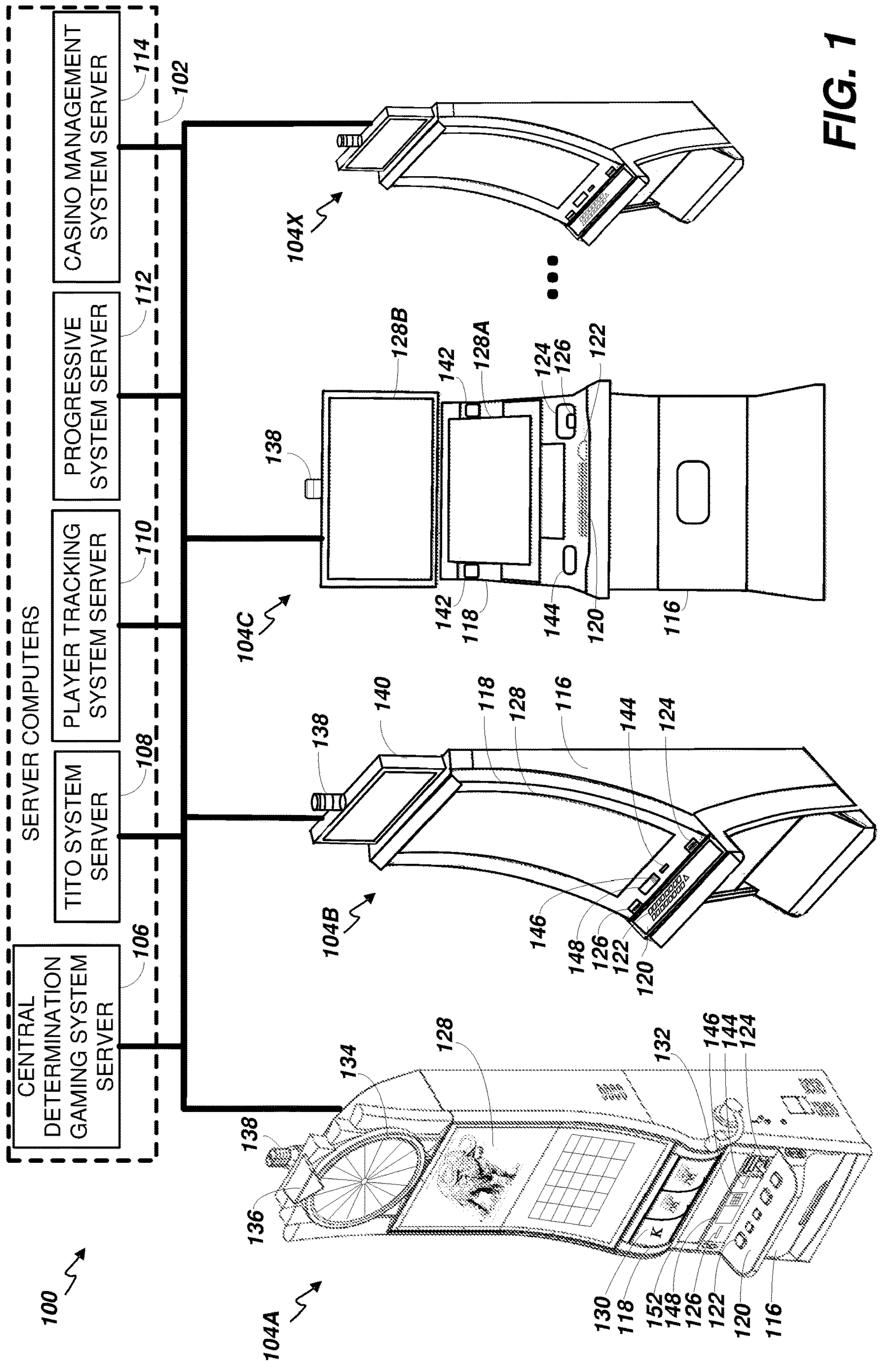
FIG. 1 is an exemplary diagram showing several EGMs networked with various gaming related servers.

As discussed above, traditional implementations of wagering games, whether electronic or analog (e.g., table games) make awards available to individual players based only on the individual game play outcomes of a player. One drawback to these types of games is that they provide a more isolated gaming experience. Each player plays their own game to win their own awards.

Another drawback to game play that provides individual awards based on individual play is that a user may have limited opportunities to win an award. The player may get discouraged if they do not win an award, particularly if a larger award, such as a progressive jackpot, is won by another player.

The present disclosure provides innovations that allow for members of a group to share in at least certain awards won by another member of the group. Allowing the group to play together for awards can increase player satisfaction, including providing a more social gaming experience. In addition, because players in a group can share in at least some awards won by other players in the group, a player who played as part of the group but did not individually win an award can receive a benefit when another member of the group wins the award.

In at least some cases, groups play collectively to win awards that are also available to non-group based players. That is, it may not be necessary to be part of a group to win an award, but choosing to be part of a group can provide the benefits noted above.

Groups can be self-defined or can be defined based on properties that may be common to multiple players. For example, a group of friends or family members could choose to play as a group. Or, groups could be defined based on criteria such as players being part of a loyalty program or being part of a club or social network, or having some kind of affiliation or status, such as being a veteran. In further aspects, players can be provided with the opportunity to play as a group (or team), and optionally may be able to choose a group, even in the absence of a social relationship or common characteristic. A user can, for example, be invited to play as a part of a team when they begin a gaming session on an EGM (e.g., they may choose to play as part of the "black team" or the "red team").

Groups may be defined, including in a group profile, such that they can identify one or more of players in the group, players that are eligible to join the group, or awards that are associated with the group. Group characteristics can also be defined that specify when/how members can be added to, or removed from, the group, as well as how an award will be distributed among the group.

Groups can be associated with awards that are at least in part not associated with game play of a wagering game. For example, transactions (e.g., for the purchase of goods or services) by group members may provide a chance to win an award, or may increase the value of the award. Non-gaming awards can be awards that are only available to groups, including to a single group, or can be awards that are also available to non-group-based users.

Example Electronic Gaming Servers and Electronic Gaming Machines

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. For example, a smart phone may require the use of location services to ensure that a player is physically located in a jurisdiction where a game is approved for use, or the use of hardware or software security features to help prevent tampering with game operation.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®, cable TV, satellite links, and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. In some cases, the progressive system server 112 is physically separate from a gaming device 104A-104X, and can be in communication with a gaming device, such as over a network. In other cases, the progressive system server 112 can be a component (including a software component or module) of a gaming device 104A-104X, and can be in communication with other components of a gaming device, such as logic or hardware used to determine other (e.g., non-progressive jackpot) game outcomes). Typically, in linked progressive systems, the progressive system server 112 is physically separate from at least one, and typically from all, gaming devices 104A-104X that participate in an associated progressive jackpot.

Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
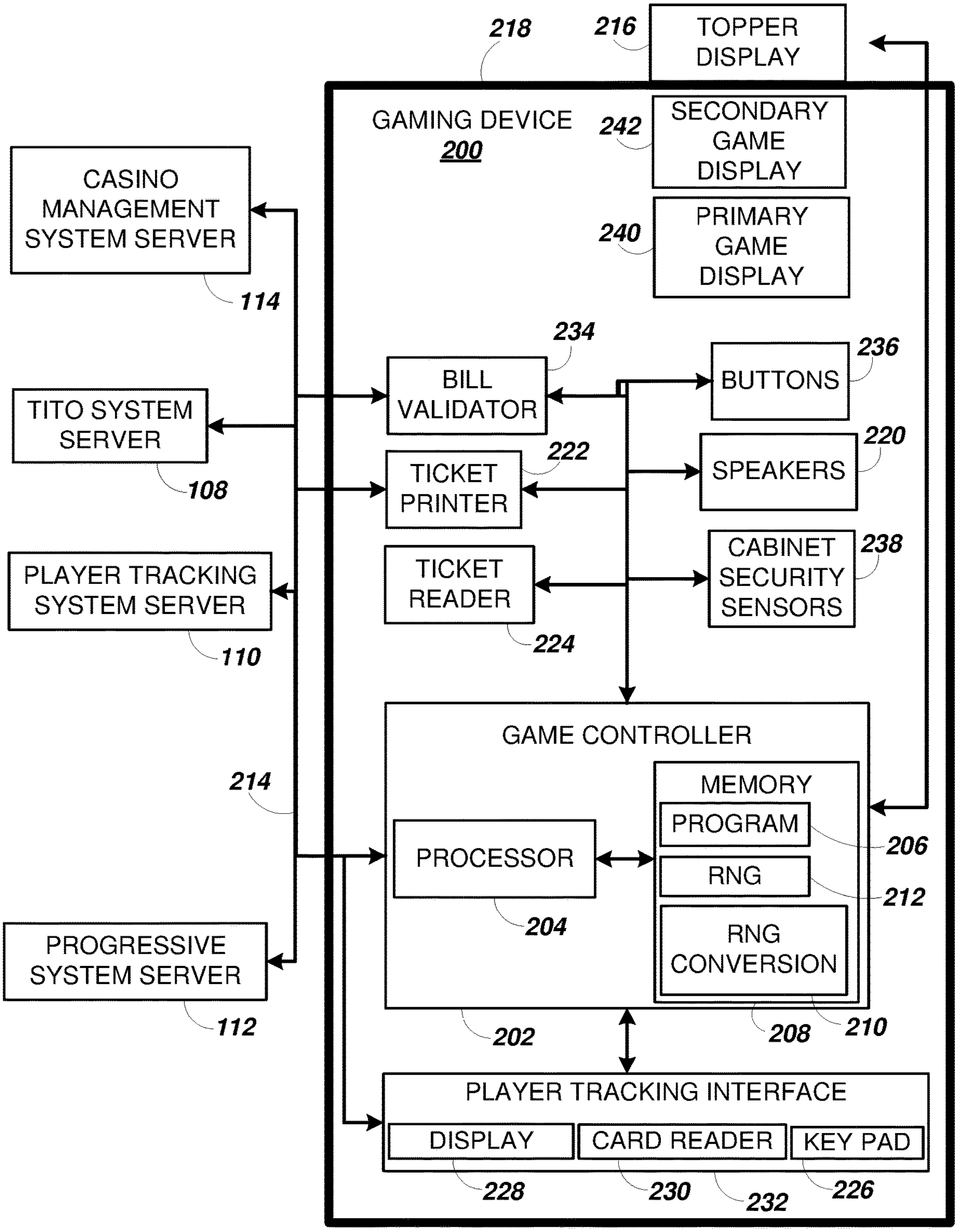
FIG. 2 is a block diagram showing various functional elements of an exemplary EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP.

In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done with game play on an EGM, he/she cashes out the credit balance, typically by pressing a cash out button to receive a ticket from the ticket printer 222. The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards.

Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
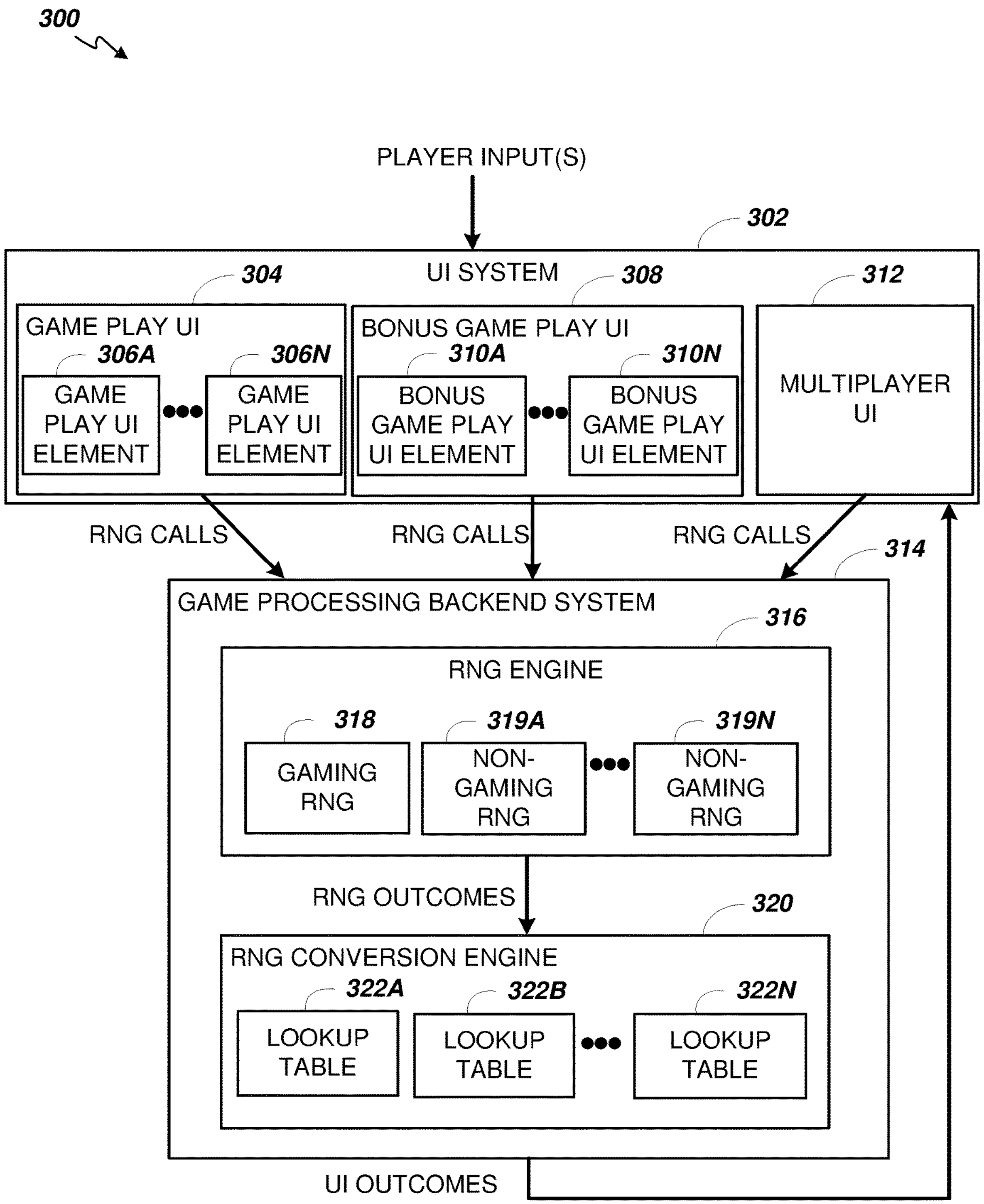
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differ or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With additional reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops fora mechanical reel. In one example, if the UI outcome is fora base game, the UI system 302 updates one or more game play UI elements 306A-306N, such as symbols, for the game play UI 304. In another example, if the UI outcome is for a bonus game, the UI system 302 could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In some cases, in response to selecting a game play UI element 306A-306N or a bonus game play UI element 310A-310N, an RNG calls the RNG engine 316 and the gaming RNG 318 provides a result from a lookup table 322A-322N that indicates that an award is conferred as a game outcome. The game processing backend system 314 can determine whether the user associated with the game play is a member of a group, and whether the award is associated with the group.

The game processing backend system 314, in some examples, can communicate with the player tracker interface and the player tracking system server 110 of FIG. 2 to obtain player identity information (e.g., a user ID). The player identity information can be used to access a profile for the player, which in turn can be used to determine whether the player is a member of a group or whether the award is associated with group-based play. Or, a player identifier can be used to search a database of player/group/award information to determine whether a given player identifier is associated with a group that in turn is associated with the award, indicating that the award may be a group award that should be distributed to at least a portion of other group members.

The game processing backend system 314, or another component (e.g., the player tracking system server 110, the progressive system server 112, or the casino management system server 114) can determine how the award being conferred should be distributed to the group. In a specific example, the player tracking system server 110 can credit the accounts of group members with any corresponding portion of the award being conferred The game processing backend system 314 can send a UI outcome to the UI system 302 that renders the game outcome for display to a player. The outcome can include an indication that the award was a group award, that part of the award was distributed to other group members, and a portion of the award being conferred upon the player associated with the game play that resulted in award conference.

When group awards are progressive awards, the progressive system server 112 can provide the game processing system 314 with information to be displayed using the UI system 302. For example, the game processing backend system 314 can generate a user interface display, or cause the UI system 302 to generate a display, that displays a game outcome for the progressive jackpot. If a progressive award, either for all players or for a game play award that is specific to one or more groups of users, is funded by means other than solely wagers placed on a gaming device 200, qualifying actions (e.g., transactions for the purchase of good or services) can be communicated to the progressive system server 112, which can appropriately update an award amount.

The progressive system server 112 can provide the game processing backend system 314 with information to be displayed using the UI system 302, regardless of whether a given game outcome results in an award of a progressive jackpot. For example, the progressive system server 112 can update jackpot amounts that are displayed on the user interface system 302.

Processes analogous to those described above for determining a game outcome based on game play on a gaming device 200 can be carried out in response to other actions. For example, a call can be made to the game processing backend system 314 when a user makes qualifying transactions, such as for the purchase of goods or services. The call can determine whether the transaction results in an award being won, or updating an award amount based on the transaction.

Example Electronic Gaming Machine with Multiple Jackpots

Figure 4:
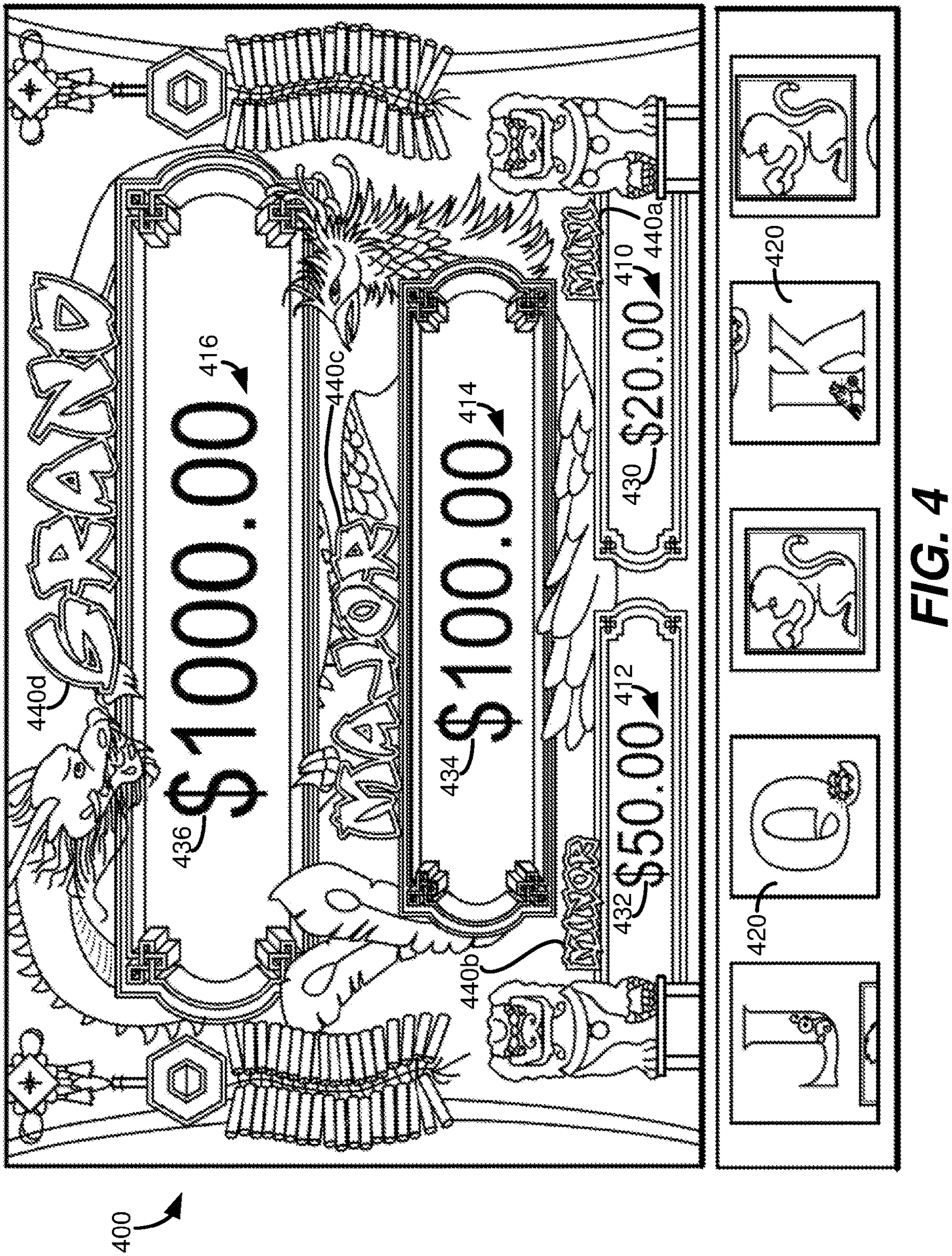
FIG. 4 is a schematic view of a display of an electronic gaming machine that includes a plurality of progressive jackpots and a plurality of reels.

FIG. 4 is a schematic view of a display 400 of an EGM (e.g., 100, 200) that includes a plurality of jackpots 410, 412, 414, 416. In some instances, one or more of jackpots 410, 412, 414, 416 can be progressive jackpots. Further, in some instances, one or more progressive jackpots can be tiered progressive jackpots. The display 400 also includes a plurality of reels 420, which can be physical (i.e. mechanical) reels or simulated reels (e.g., on a video display). The jackpots 410, 412, 414, 416 are shown as having different values, respectively values 430, 432, 434, 436. Although four jackpots are shown, a given EGM need not include any jackpots, or can include more or fewer jackpots than shown. Similarly, an EGM can have a single progressive jackpot or can have more or fewer than four progressive jackpots.

In the display 400, the jackpots 410, 412, 414, 416 can be labelled to help a player distinguish between the jackpots, such as the relative importance or value of a jackpot. As shown, labels 440*a*, 440*b*, 440*c*, 440*d* indicate that the jackpots 410, 412, 414, 416 are, respectively, a mini jackpot, a minor jackpot, a major jackpot, and a grand jackpot. The levelled nature of the jackpots 410, 412, 414, 416 is consistent with the values, 430, 432, 434, 436, as the values increase from the mini jackpot 410 to the grand jackpot 416, with a value of a "higher" level jackpot typically being greater than a value of any jackpot at a lower level.

As discussed, jackpots can have different types, such as being of a fixed value or being progressive jackpots. Progressive jackpots can be a stand-alone progressive (SAP) jackpot maintained with respect to a single EGM (e.g., an EGM on which the display 400 is shown), or can be a local area progressive (LAP) jackpot or wide area progressive (WAP) jackpot linked to a progressive system server that communicates with one or more additional EGMs. The jackpots 410, 412, 414, 416 can be of the same types, or can be of different types. For example, the mini jackpot 410 and the minor jackpot 412 can be stand-alone progressive jackpots, the major jackpot 414 can be part of a first linked local area progressive system, and the grand jackpot 416 can be part of a second linked wide area progressive system (typically part of a progressive system that has a larger number of participating EGMS than for the first linked progressive system). In some instances, one or more jackpots of jackpots 410, 412, 414, 416 can be fixed level jackpots.

The jackpots 410, 412, 414, 416 can be associated with different wager levels. It may be necessary for a player to make a wager at a defined or threshold value in order to have a given jackpot 410, 412, 414, 416 available as a game outcome. For example, if a player wagers a minimum amount, they may qualify for the mini jackpot 410. As the player wagers progressively more, they can qualify for higher-value jackpots 412, 414, 416. In some cases, a single jackpot 410, 412, 414, 416 is available for a given game played on the EGM. In other cases, multiple jackpots 410, 412, 414, 416 may be available as awards for a given game played on the EGM. Betting a maximum amount, for example, may qualify the player to potentially be awarded the mini jackpot 410 or the grand jackpot 416. Having multiple jackpots available can include having different jackpots 410, 412, 414, 416 associated with different aspects of a game, such as having one or more jackpots (which can be fixed or progressive) associated with a specific EGM, one or more jackpots associated with a first linked progressive system, and one or more jackpots associated with a second linked progressive system. Or, different jackpots can be available with different game play features, such as having one jackpot be associated with a base game, another jackpot being associated with a first bonus game, and another jackpot being associated with a second bonus game.

Typically, an increment rate, and, at least for some jackpots, an escrow rate, are associated with progressive jackpots that are active for a given wager. That is, for example, if jackpot 412 is the only active progressive jackpot for a given wager, a contribution will be made to the jackpot value 432 based on the increment rate and a contribution can be made to escrow based on the escrow rate, provided that the escrow rate or the increment rate may be zero (although, as mentioned, typically the sum of the increment rate and the escrow rate is set to equal a total progressive contribution rate set for the EGM). If multiple jackpots are active for a given wager, multiple contributions can be made to any of such jackpots that are progressive jackpots, where the contributions can be the same or different, and at least some of the contribution can be made on behalf of multiple jackpots (e.g., a contribution may be applied to the escrow, where the escrow can be applied to multiple jackpots, optionally including jackpots that are not active for the given wager).

Certain aspects of the present disclosure relate to making one or more progressive jackpots available to a group of players. If a member receives an award as a game outcome, at least a portion of a progressive jackpot's value is awarded to multiple members, including all members, of the group. When the progressive jackpot is associated with a wagering game, the progressive jackpot can also be available to players that are not part of any given group. That is, the wagering game associated with the progressive jackpot can be played by any individual player in a gaming establishment (or online) where the game is available for play.

Figure 5:
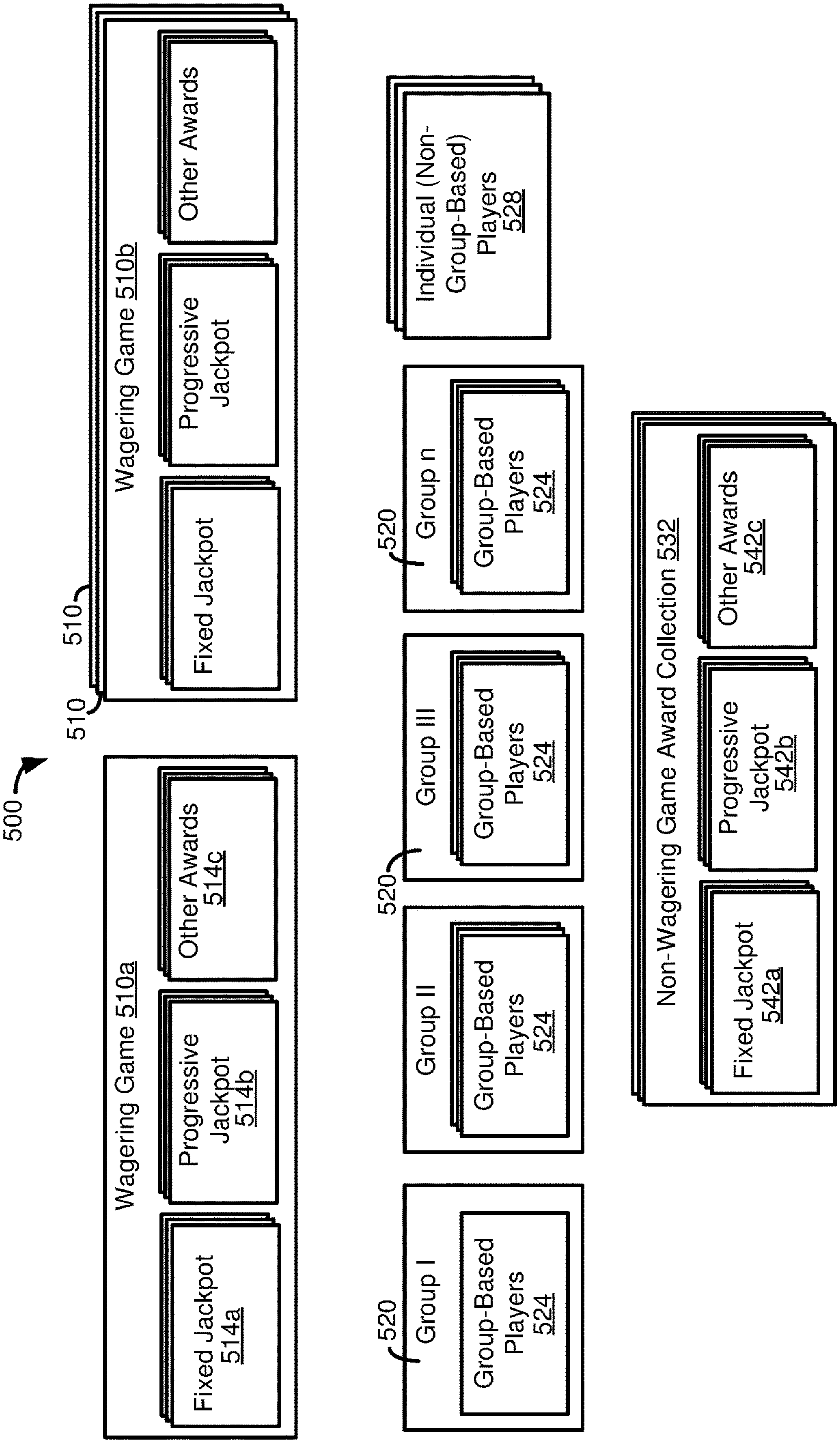
FIG. 5 is a diagram illustrating how group-based players and non-group-based players may be eligible to receive awards associated with wagering games or non-wagering game awards.

Example Scenario Having Wagering and Non-Wagering Game Awards Available to Group and/or Non-Group Based Players FIG. 5 illustrates an example scenario 500 where various awards can be made available to group-based players, at least some of which awards are also available to non-group-based (i.e., individual) players. The scenario 500 includes a plurality of wagering games 510, including wagering game 510*a* and wagering game 510*b*. Each wagering game 510 is associated with at least one award 514 (shown as awards 514*a*-514*c*).

The awards 514 can be of different types. For example, a wagering game can have one or more fixed jackpots 514*a*, one or more progressive jackpots 514*b*, one or more other awards 514*c*. The other awards 514*c* are typically smaller in value, and possibly awarded more frequently, than a jackpot 514*a* or a progressive jackpot 514*b*.

Although FIG. 5 illustrates each of the wagering games 510 as including fixed jackpots 514*a*, progressive jackpots 514*b*, and other awards 514*c*, a given wagering game need only have at least one award of at least one type. However, wagering games 510 can include multiple awards 514 of a given type and/or multiple award types. When the scenario 500 includes multiple wagering games 510, the wagering games can include the same number or type of awards 514, or can include different numbers or types of awards. In addition, awards 514 of a given award type are typically associated a value, and the values of the award types can be the same for different wagering games 510, or can be different.

The wagering games 510 are available to be played by one or more groups 520, where a group includes a plurality of group-based players 524 who are playing as a group. When an award 514 is determined to be awarded as a game outcome based on game play by a group-based player 524, at least a portion of the award is shared with other group-based players of the associated group 520. As will be further described, groups 520 can be associated with group definitions, where a group definition can include rules for determine what awards 514 are distributed to players 524 in the group, and how such awards will be distributed (which can include determining group members who will receive part of an award and the amount of such part).

The wagering games 510 are also available to be played by one or more non-group-based (or individual) players 528. In other words, group-based players 524 complete against group-based players of other groups 520 for awards 514, as well as against non-group-based players 528. The game play by non-group-based players 528 is unrestricted—any player who wishes to play a wagering game 510 can do so either as part of a group 520 or as a non-group-based player 528. In some cases, a given group based player 524 can be part of multiple groups 520, or can be allowed to play (at least for a period of time) a wagering game 510 as a non-group-based player.

Disclosed innovations can be contrasted with tournament-type games, where individuals or groups compete against each other for one or more prizes that are typically not directly tied to game outcomes achieved by a player, or players in a group. That is, typical tournaments provide awards to the group or player with the highest winnings over the tournament period, but the awards do not directly correspond to the winnings. In addition, tournaments are not typically available to non-tournament players. That is, tournaments do not have tournament players or groups competing for the same award as players playing a non-tournament wagering game.

The group-based players 524 can also be eligible for one or more collections 532 of non-wagering game awards 542 (shown as awards 542*a*-542*c*). The non-wagering game awards 542 can be of the same general types as the awards 514, such as including fixed jackpots 542*a*, progressive jackpots 542*b*, or other awards 542*c*. As with the awards 514, group-based players 524 can be eligible for at least a portion of an award 542 if any group-based player in the group 520 wins an award 514.

The awards 542 can be awarded randomly, or based on other criteria. However, game play on a wagering game 510 is not required in order to qualify for an award 542. In at least some cases, game play on the wagering game 510 does not provide an opportunity to receive an award 542, while in other cases an award 542 can be made either based on game play on a wagering game or based on other, non-wagering game criteria. As an example, and as will be further described, chances to win an award 542 can be provided in response to activities such as purchasing goods or services, or meeting other criteria (e.g., signing up for a loyalty program, making a visit to a gaming establishment, even without engaging in game play on a wagering game 510 at the gaming establishment).

In various embodiments, player, operators, or both are able to configure whether particular EGMs, or particular gameplay, have access to group-based awards. For example, operators may be able to configure whether a particular EGM will participate in group awards, and which groups awards will be available. Allowing operators to selectively configure EGMs for group-based play can provide operators with greater flexibility in managing player interest, as well as managing business-related considerations (such as if fees are incurred to make group-based awards available).

When a player initiates a gaming session, the player can, at least in some cases, select whether gameplay will be carried out with group-based awards being enabled. However, in at least some cases, once a user joins a group, gameplay, at least for a particular game, will be carried out using rules for group awards, unless the user is removed from the group or other conditions (e.g., end of a determined time period for group play) have been met. If a user is able to select between non-group and group-based play, including particular games, the user may be able to change between such play types during a particular gaming session.

Example User, Group, and Award Profiles

Figure 6:
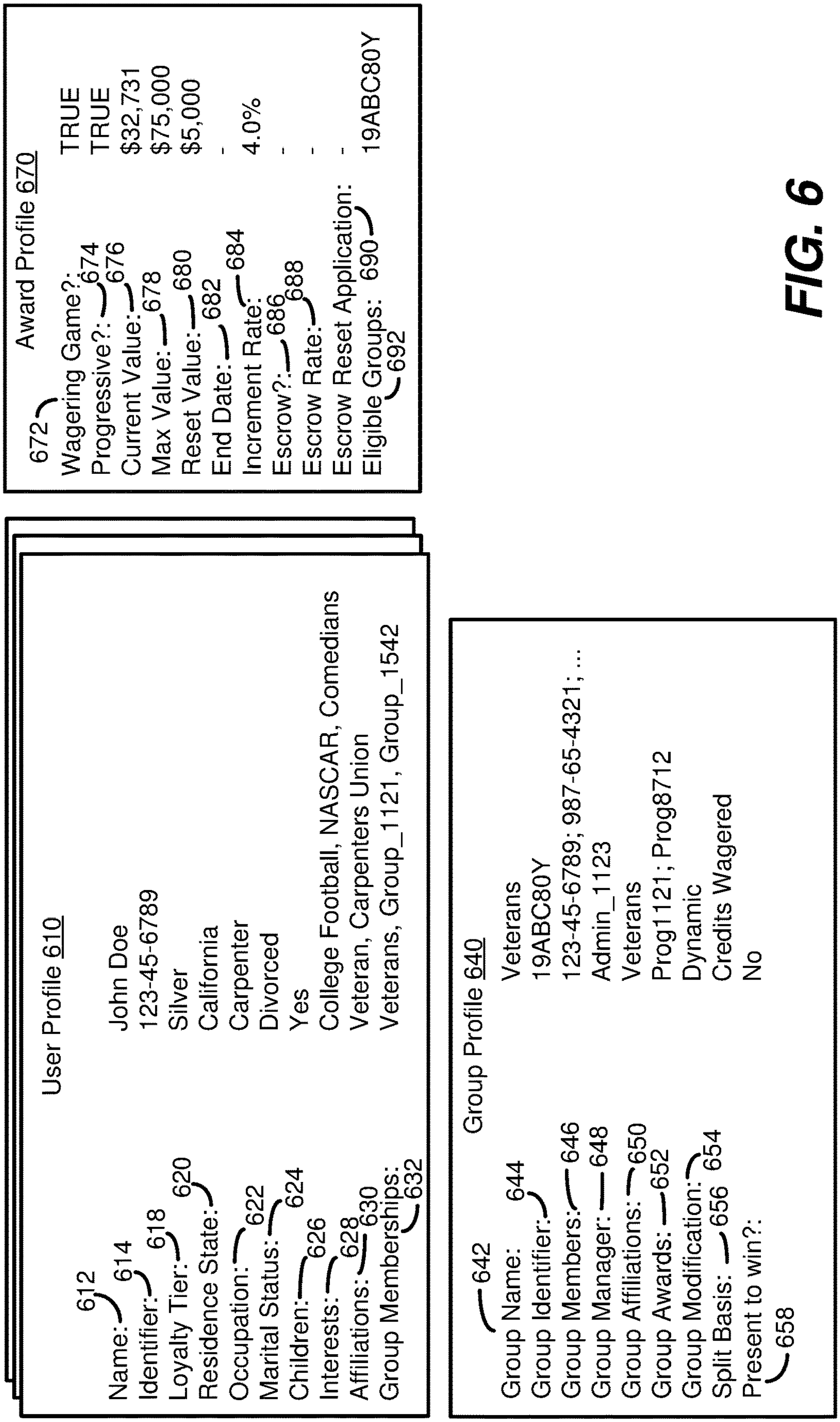
FIG. 6 is diagram illustrating example implementations of a player profile, a group profile, and a user profile.

FIG. 6 provides an example of how groups can be defined using information for individual users (which can be players, when an associated award is for a wagering game), and how awards can be designated as associated with one or both of group-based play or non-group-based play. Users, of one or both of a wagering game or a non-wagering game, who may be associated a group are typically associated with a user profile 610. Non-group-based users can also be associated with a user profile 610. However, at least some awards can be made available to non-group based players who do not have a user profile.

As an example, consider a slot machine that accepts currency and other forms of credits (e.g., ticket-in ticket-out system), and provides for player tracking functionality. A non-group based player could play a wagering game by inserting currency into the slot machine. In this, case no information about the player is obtained by the slot machine. However, a non-group-based player could insert a loyalty card into the slot machine (e.g. by inserting the card into a player tracking device card reader of the slot machine), which would provide the slot machine with information regarding the non-group-based player. Typically, for group-based players, some kind of identifying information for the player would need to be provided to the slot machine, such as information sufficient to associate the group-based player with a particular group.

In some aspects, a player can be provided with an option for group-based play for the duration of a gaming session, including without entering specific player identification information. A wagering game may have one or more groups which a player can choose to join during a gaming session (where a gaming session can be the period between when a player inserts credits into a wagering game and when the player cashes out). As an example, a user may be provided with an option (e.g. via a user interface of the gaming machine) to join a "red team" or a "black team." If the user is on the "red team" when another member of the red team wins an award, the user may be entitled to a portion of the award. However, if the user wins the award, part of the award may not be awarded to the user, but instead be awarded to other members of the "red team." Thus, the user may choose to share in the awards of others, but in doing so may be required to share a portion of an award they may receive.

In some cases, a user profile 610 can be a player profile—a profile for a user who is to be associated with a game, which can be a game of chance, including a wagering game. In other cases, a user profile 610 can be used for a user who is eligible for an award, but where the player may not specifically play a game. As an example, a user who may receive an award based on the purchase of goods or services, not based on wagering game activity, may be considered a non-player user. Unless the context indicates otherwise, aspects of the present disclosure related to group-based awards that are described with respect to "players" also apply to such non-player users.

The user profile 610 is shown as including information that can be used to identify a user and associate a user with one or more groups. Information in a user profile 610 can also be used to determine what groups a user might be eligible to join, and can be used to include a user in a group or to invite a user to join a group. The user profile 610 includes a name 612 for the user, as well as a user identifier 614. The user identifier 614 is typically a unique identifier (such as a social security number or a unique user identifier assigned by a player tracking system), which can be useful, such as in the event two users have the same name 612.

If the user is associated with a loyalty program, a level or tier 618 associated with the user can be included in the user profile 610. Residence information, such as a state 620 in which the user resides can be included in the user profile 610. Other types of information that can be included in a user profile 610 includes an occupation 622 of the user, a marital status 624, an identifier 626 of whether the player has children, a list of interests 628 of the user (which can be manually entered by the user or can be determined based on tracking user behavior or mining other data sources for information regarding the player), organizations 630 with which the user is affiliated (e.g., veterans groups, unions, clubs, religious organizations, political parties, social media groups), and identifiers 632 for groups (for group-based awards) of which the user is a member.

A user profile 610 can include more, less, or different information than shown. For example, rather than storing group identifiers 632 that indicate to which groups a user belongs, a group profile 640 can maintain information regarding users belonging to that group (and optionally users eligible to be members of the group).

The group profile 640 can be used to track various attributes of a group. A group profile 640 can include a name 642 for the group and a group identifier 644. The name 642 can be a name that is more meaningful to users, while the group identifier 644 can be used to uniquely identify the group, and may be more readily used by a computing device.

As mentioned, a group profile 640 can include identifiers 646 for members of the group. The identifiers 646 can be included instead of, or in addition to, including group identifiers 632 in a user profile 610.

Group manager identifiers 648 can be provided. Group managers can be users (who can be players) who are authorized to make changes to some or all of the information in a group profile 640. In some cases, a group manager can manage users who are members of a group, either by adding or removing identifiers 646 for group members or by changing other membership criteria (such as organizations whose affiliated players are eligible for membership in a group). While in some cases group membership is available based on particular properties of a user, in other cases groups can be self-defined by users. That is, users can elect to join a group, and in some cases to leave a group, without any commonality between user profiles being required. Membership in a group can be unmanaged, or one or more individuals can be designated as group mangers. A group manager for a group can be a user, or can be an administrator or other user who need not be a user (e.g., having a user profile or being a member of a group, including the group being managed). For example, an employee of a gaming establishment can manage group members.

Like a user profile 610, a group profile 640 can include identifiers for one or more affiliations 650. The affiliations 650 can be used to match groups with awards, or to match groups with user profiles 610, either for inclusion in a group or consideration for inclusion in a group. Award identifiers 652 can be included in a group profile 640, and used to indicate for which awards the information in a group profile 640 is valid or is to be applied. In one implementation, users can specify sharing criteria with respect to multiple awards, including awards that might be provided in different ways, including by different types of EGMs or by table-games or other types of wagering games. For example, users could designate that all winnings, regardless of source, above a threshold amount are placed into a pool that will be split among group members.

A group profile 640 can include information regarding changes to group membership or how a group award will be distributed to group members. As shown, the group profile 640 includes a group modification type 654. Group modification types can include options such as "dynamic," where users can be added at any time to the group, including after group-based game play has started and before an award has been made. Another group modification type is "static," where no changes can be made to the group.

A "new game" group modification type indicates that any changes to group membership occur after an award has been made in one round of game play and before a next round of game play. For example, in a "new game" group modification type where a group plays for a progressive jackpot, the group members cannot be changed until the progressive jackpot is awarded (even if not to the group). After the progressive jackpot resets, and game play for the reset jackpot is available, changes to the group membership can be implemented. Or, changes to the group can be made until a group member places a wager on a wagering game or otherwise initiates game play.

A split, or distribution, basis indicator 656 can be provided in the group profile 640. Split bases can include options such as proportionally based on number of credits wagered, number of handle pulls, coin-in, coin-out, player loyalty points earned (e.g., in a player tracking/loyalty system), number of credits won, time played, number of gaming sessions, or combinations of these or other factors. When non-game play activity provides the possibility of winning an award, or increases the probability of winning an award, the split bases can incorporate related factors (e.g., an amount spent on transactions that qualify for the award). Although in some cases awards are shared proportionally to some criteria, in other cases they need not be. For example, certain players may be given a "handicap." In addition, bonuses can be provided based on various criteria, such as providing a bonus for a player whose game play resulting in an award, providing bonuses for players who were actively playing a game at the time of an award, providing a bonus for a player who wagered the most or who played the longest, or combinations of these or other factors.

A group profile 640 can include indicators for other factors that determine which users are eligible to receive part of an award, or an amount that users will be awarded. As shown, an indicator 658 can indicate (e.g., as a Boolean value) whether a user need be present (such as actively playing a game, for example, being carded into an EGM) when an award is won by a group in order to receive part of the award.

Group profiles 640 can include additional information, including how long the group will be maintained. For example, a group could decide that they would like to have collaborative gameplay for a period of time (e.g., a night, a weekend), and that they will share at least certain awards won during that period. Or, as described above, groups can specify that the group is maintained until an available award (e.g., a progressive jackpot) is won (whether by the group or not).

FIG. 6 provides an example of an award profile or configuration 670. The award profile 670 can include information regarding awards that are available to groups and/or non-group-based players. In some cases, the award profile 670 can be used to define parameters for an award, such as for use in configuring a wagering game. In other cases, the award profile 670 can correspond to implementation details for the award, but does not directly control or configure the award.

A Boolean value 672 can be used to indicate whether the award is associated with a wagering game, while a Boolean value 674 can be used to indicate whether the award is a progressive award. As noted above, progressive awards can be used for user groups, even if the progressive award is not part of a wagering game.

An award profile 670 can list a current value 676 for the award. The current value 676 can represent a value for a fixed-value award, or a current value of a variable-value award, such as a progressive award (e.g., a progressive jackpot). If an award has a variable value, the award profile 670 can list a (optional) maximum value 678 for the award and a reset value 680 for the award. The reset value 680 can represent an amount to which the award will be reset after being won, or upon satisfaction of other criteria (e.g., a period of time passing without the award being awarded). If the award has an end date, such as date the award will expire or a date by which the award must be won, that end date 682 can be included in the award profile 670.

An increment rate 684 can be used to determine a growth rate for a variable-value award. The increment rate 684 can represent an amount corresponding to a percentage of a wager or transaction that will be added to the current value 676. In other implementations, rather than being a percentage, the increment rate 684 can be a fixed amount, such as adding a determined amount to the current value for every qualifying wager or transaction.

Certain awards can be associated with one or more escrow accounts. In some implementations, all or a portion of value that can correspond to a wager or transaction amount, or a fixed amount, can added to an escrow account, such instead of adding the value to a current award value 676. Escrow can be used to increase a current value of an award 676, including upon reset of the award or during the time an award is active, such as being used to increment the current award value during period of low wager or transaction activity which would normally increase the current value. A Boolean value 686 can indicate whether the award is associated with an escrow account. If so, the award profile 670 can include an escrow rate 688 (a rate at which value will be added to the escrow, which can be similar to how value is added to the current value 676 using the increment rate 684). If escrow is added to a reset value 676, an amount 690 (e.g. a fixed amount or a percentage of a total escrow) to be applied can be specified in the award profile 670.

In some cases, some awards may only be available to particular groups, regardless of whether the award is available for non-group-based players. Or, it can be useful to track what groups are associated with a given award, including for purposes of user activity tracking, design of future games or awards, or to facilitate determining whether a user associated with an award is part of a group. Groups 692 eligible to receive the award, or registered with the award, can be included in the award profile 670.

Figure 7:
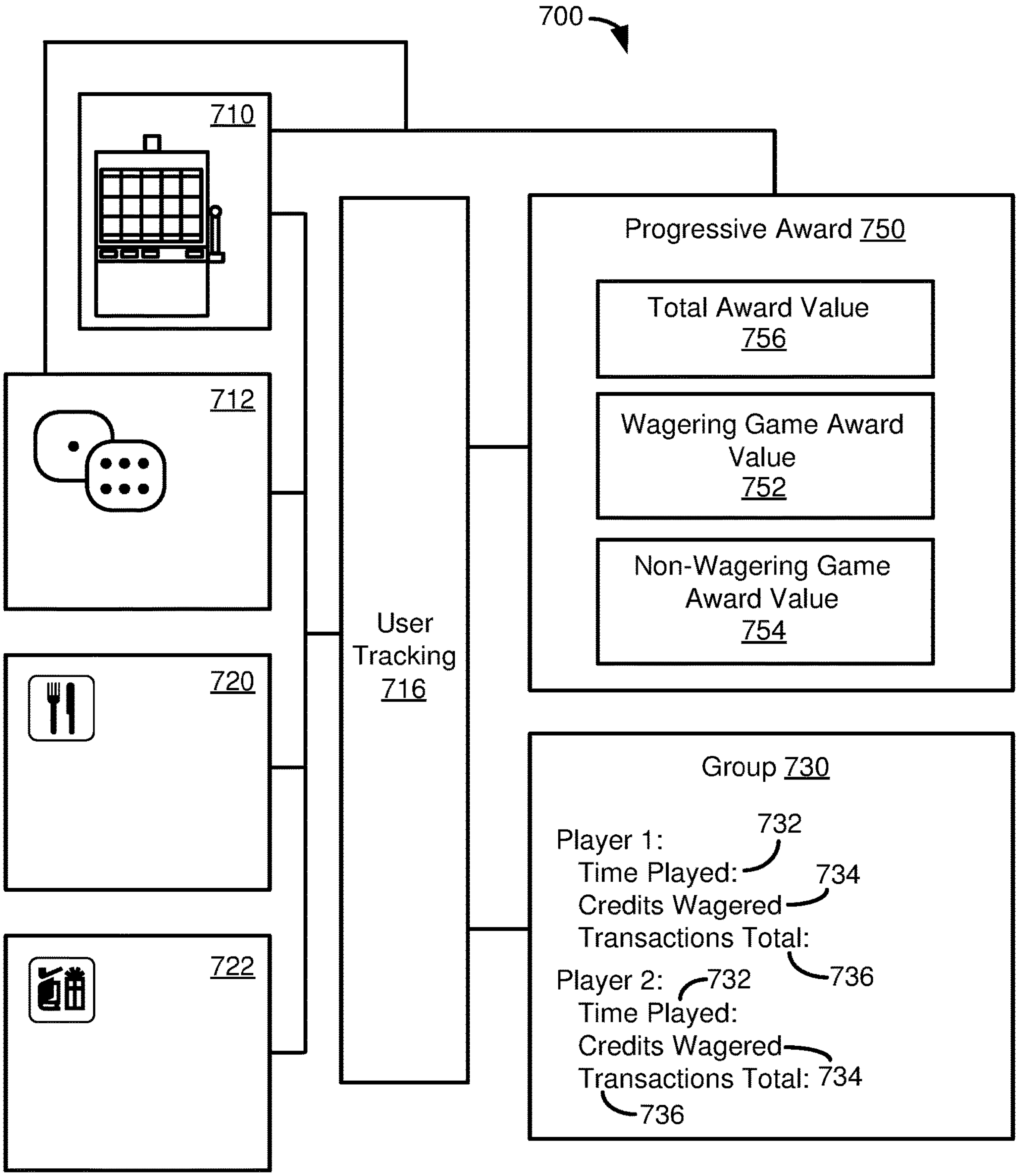
FIG. 7 is a schematic diagram illustrating how a user tracking system can be used to determine whether game play or transactions by a user are associated with a group-based award.

Example Scenario for Tracking Wagering and Non-Wagering Activity for Group Members FIG. 7 illustrates a scenario 700 where one or both of a wagering game or transactions for goods or services are associated with one or more awards that are available to groups, and optionally to non-group-based players. In the scenario 700, wagers placed on wagering games can be associated with a contribution to a progressive award. Additional value can be added to a progressive award, which can be the same or different than a progressive award associated with a wagering game, based on transactions for goods or services.

FIG. 7 illustrates that wagering games, including EGMs 710 and table-based wagering games 712, can be associated with a user tracking component 716. Non-wagering game transactions can include transactions associated with various goods or services, such as the purchase of food or beverages 720 or purchases at shops 722. However, transactions are not limited to these sources.

When a wagering game is played, the user tracking component 716 can determine whether the user (player) is associated with a user identifier, such as based on a player tracking system. If so, the user tracking component 716 can determine whether the user is a member of one or more groups, such as the group 730. If so, statistics for the game play can be added to information maintained for the group 730. As shown, for example, information maintained for the group 730 includes an amount of time 732 the user played one or more wagering game, and a number of credits 734 wagered by the user on the wagering game. Game play information can be used, among other things, to determine how a progressive award 750 will be distributed among the group 730 in the event the award is won by a member of the group.

As wagers are placed on the EGMs 710 or the table-based wagering games 712, a wagering game award value 752 of the progressive award 750 can be increased. In some cases, the wagering game award value 752 can be increased in other ways, particularly from contributions that are not directly tied to game play activity, such as increasing the value using an escrow account.

When transactions are carried out for purchases of food or beverages 720 or at shops 722, an identifier of the purchaser can be conveyed to the user tracking component 716. The identifier can be an identifier associated with a user (or player) tracking system or loyalty program, or can be deduced from other information, such as using a credit card number associated with the transaction or the user's government issued ID. The user tracking component 716 can determine whether the user associated with the transaction is part of the group 730. If so, information for the transaction can be added to the user's information maintained as part of the information for the group 730. For example, the information for the group 730 can include a total amount of qualifying transactions 736 made by each user.

The transaction information can also be conveyed to a system that maintains the progressive award 750, such as for use in updating a non-wagering game award value 754. In some cases, the wagering game award value and the non-wagering game award value 754 can be combined (e.g., added together) to provide a total award value 756.

The non-wagering game value 754 can be provided, in some cases, only when a member of a group 730 wins the award 750. In such case, the non-wagering game value 754 can result from transactions only for the winning group, or can include transactions for other groups. In other cases, the non-wagering game award value 754 is available as part of the total award value 756 for both group-based and non-group-based players.

Example Method for Defining a Group

Figure 8:
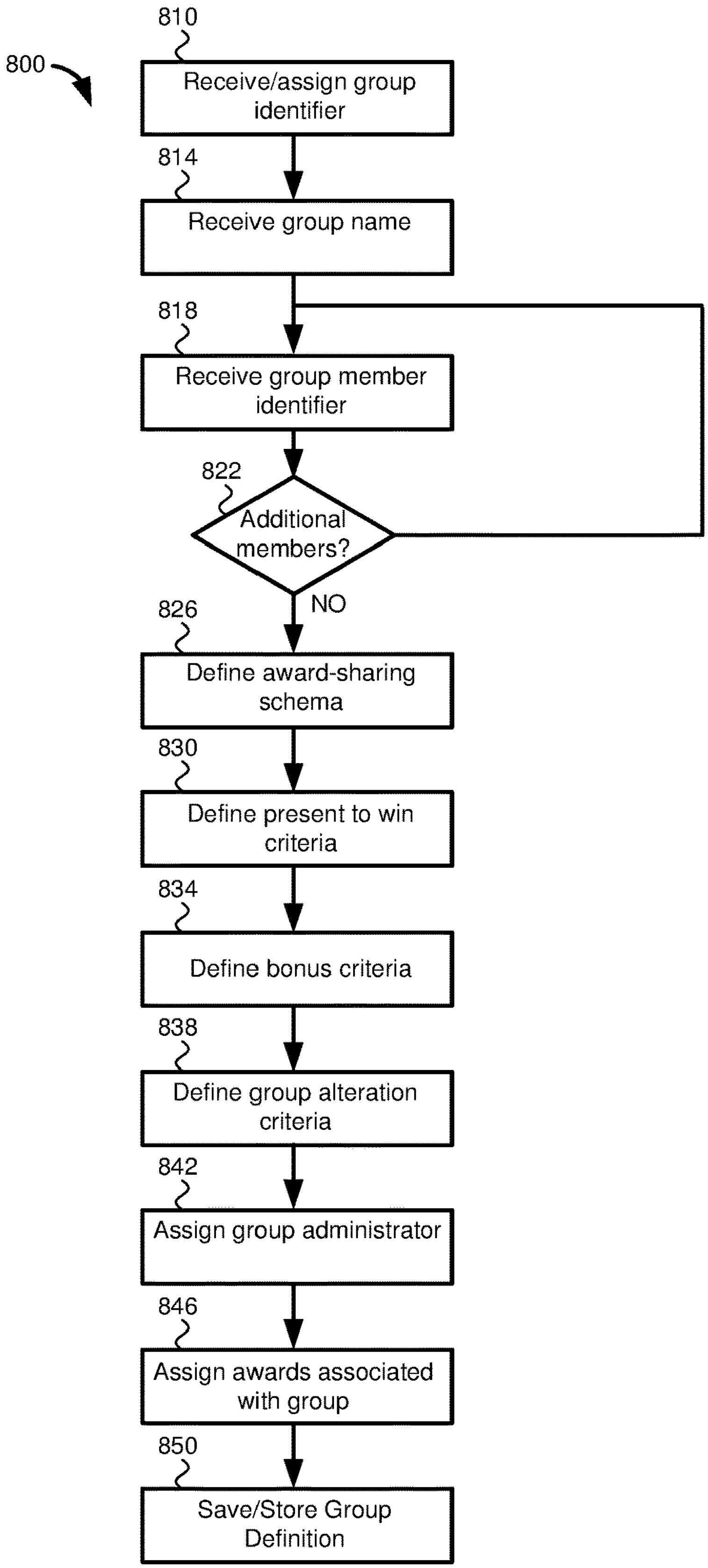
FIG. 8 is a flowchart of an example method for defining a group profile.

FIG. 8 is a flowchart illustrating an example method 800 for defining a group, such as the group 730 of FIG. 7. At 810, a group identifier is received or assigned. Typically, the group identifier allows a given group to be uniquely identified. A group name is received at 814. At least in some cases, a group name need not be unique. There could be multiple groups called "veterans" or "Steve's group," provided that each group has a unique group identifier.

A member can be added to the group at 818. As shown, each group member is added sequentially. After adding a group member at 818, the method 800 determines at 822 whether additional group members are to be added to the group. If so, the method returns to 818. However, in other cases adding a group member at 818 can include adding multiple group members, including by providing an identifier for another group, where members of that group (optionally subject to other criteria) can be added to the group being defined through the method 800. In other words, groups can be hierarchically defined or otherwise related, such as having a group that is a subset of another group.

Once 822 determines that no additional group members are to be added to a group, the method 800 proceeds to 826, where an award sharing schema is defined. The award sharing schema can be a rule, such a rule of a defined set of rules from which a user carrying out the method 800 can select. Examples of defined rules include sharing an award pro rata based on criteria such as playing time or number of credits wagered, or combinations, including weighted combinations, of these or other criteria. Users can also choose to define their own schema, or to adjust defined rules, such as assigning fixed percentages to group members that define how awards will be shared, or increasing or decreasing share proportions for individual members as compared with a default value suggested by a defined rule. Setting fixed share percentages can be useful in situations where group members initially agree to wager (or engage in transactions for) a particular amount, which amounts can be the same or different.

How an award is shared between members can be affected by other criteria. That is, percentages can be adjusted upwards or downwards, or fixed percentages or amounts provided, for at least a portion of an award's value. As an example, at 830, a user can define criteria that adjusts a user's award based on whether they were present (e.g., carded into a wagering game) at the time the award was won. Criteria defined at 830 could provide that users present at the time of the award receive a percentage of the award, with a remainder of the award split as determined by the schema defined at 826. Or, players who are present at the time the award was won might be entitled to an increased percentage of the award (which would result in non-present players having their percentage effectively reduced).

An award sharing schema can also specify criteria for what awards are eligible to be split among the group. For example, the sharing schema can specify that only certain awards, such as jackpots or awards above a threshold value, are to be shared with the group.

At 834, a user can define other bonus criteria. Other bonus criteria might include providing an additional amount (which can be fixed or a proportion of the award) for a user who won an award. Providing a bonus for a player who specifically won an award, such as winning a jackpot, may be particularly desirable when an award is available to non-group-based players, as opposed to scenarios where an award is explicitly contemplated as being only available to group-based players.

Rules or criteria for altering group membership can be specified at 838. Group alteration criteria can include determining if users can be added to or removed from the group, and under what circumstances. A group can be designated as unalterable, if desired, or only alterable if no award is active for the group (e.g., group members have not started game play on a wagering game for which they have agreed to share an award). In other cases, group membership can be altered when outstanding awards are available to the group. If a group member decides to leave, or is otherwise removed from the group (e.g., for failure to engage in game play at an agreed-upon level), criteria specified at 838 can include determining whether a user is completely removed from the group, such that they are not eligible for part of a group award, or reducing or fixing their proportion of the award at a particular level. In some cases, when a user is removed from a group, their activities are no longer attributed to the group, but the user does not lose the benefit of prior activities during the period they were active in the group. If the group had a pro-rata distribution schema based on credits wagered, for example, and a user placed $10 in wagers before they became inactive, their $10 of wagers would still be considered if/when a group award was analyzed for distribution.

Group member addition criteria can include defining how an added member will be incorporated into an award-sharing schema. In some implementations, an added member can be provided with a reduced share of a group award, where a reduction can optionally be proportional to how long the group has been eligible for an award. Or, an added group member might receive no portion of a group award, or a reduced portion of a group award, until they have been a group member for a defined time period, or have met other criteria, just as satisfying a threshold level of wager activity.

One or more group administrators can be assigned to the group at 842. Group administrators can be group members, in some cases. In other cases, a group administrator is not a group member. Particularly when groups are not self-organized, it can be useful to have an administrator who is not a group member. Group administrators can be responsible for various tasks, such as updating an award schema or other award criteria, approving the addition or removal of a group member, changing membership criteria, or registering the group with various awards.

One or more awards can be associated with the group at 846. In some cases, specifying awards for a group can include specifying one or more wagering games or contests, where at least some of the awards available in the game or contest can be split among the group. Associating awards with the group at 846 can include specifying particular awards for particular games or contests. In other cases, a game or contest is specified, and an award sharing schema can determine which awards will be shared with the group, and how such sharing is implemented. When different games or contests are associated with a given group, the same sharing schema can be used with all games or contests, or different games or contests can be associated with different sharing schema, which can also be defined at 826.

Once the group has been defined, a group definition can be stored at 850. The group definition can be retrieved and used to determine whether particular awards are associated with group-based play, and, if so, how such awards should be distributed.

Example Method for Group Definition Based on User Characteristics

Figure 9:
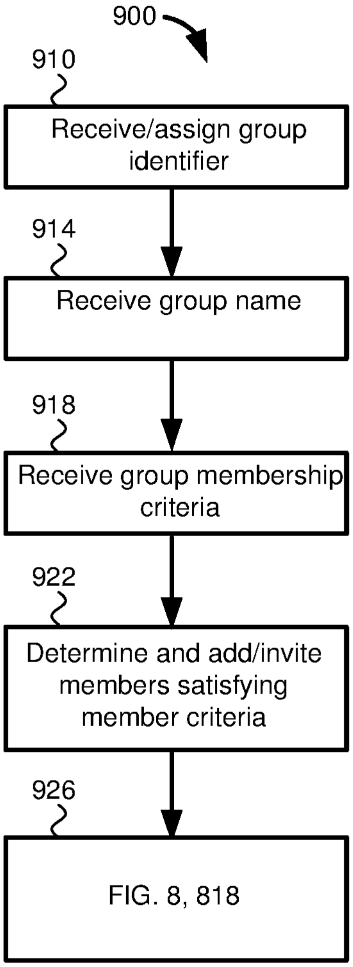
FIG. 9 is flowchart of an example method for defining a group based on group member eligibility criteria.

FIG. 9 is a flowchart illustrating an example method 900 for defining a group, where members are selected for membership, or invited to be members, based on various criteria. That is, the method 800 of FIG. 8 can be used in situations where groups are manually defined without requiring a common property among group members—family or friends can decide to form groups as they wish. In FIG. 900, membership requires possible members to have particular characteristics, such as being part of a loyalty program or being members of a veteran's organization.

A group identifier is received or assigned to the group at 910, and a name can be provided for the group at 914, which actions can at least be analogous to the actions 810, 814 of the method 800. Group member criteria is received at 918. Group member criteria is defined specified with respect to profiles for users who will be analyzed for membership eligibility. The user profile can be the user profile 610 of FIG. 6. Group membership criteria is typically specified with respect to one or more attribute types in a user profile where multiple users can have the same value for a given attribute. In other words, group membership criteria are typically not specified with respect to an attribute where attribute values are unique to a given user (e.g., a user ID).

At 922, users meeting the group member criteria are determined. When user profiles are stored in a database, matching users can be determined by querying the database (e.g., using a SQL query). In some cases, all qualifying users are added to a group. Automatically adding users to a group can be useful when the group is associated with an award that is not available to non-group-based users, such that a group user does not potentially lose value for any individual awards by having to share them with a group. In other cases, qualifying users can be notified that they are eligible for group membership, or allowed to join a group (e.g., a user can be presented with groups they are eligible to join). The method can then continue to 818 of the method 800 at 926.

Example Method for Award Definition

Figure 10:
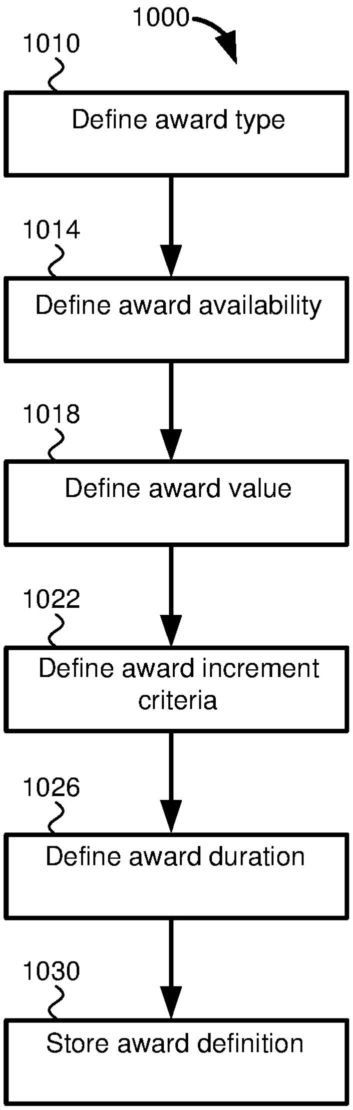
FIG. 10 a flowchart of an example method for defining an award that is associated with group-based players, such as for inclusion in, or reference by, a group profile or a user profile.

FIG. 10 is a flowchart of an example method 1000 for defining an award. In some cases, the method 1000 can be used to instantiate an award. In other cases, the method 1000 reflects information regarding an award made available (or instantiated) through other means, such an award provided by a wagering game, including a wagering game of an electronic gaming machine. A result of the method 1000 can be an award profile, such as the award profile 670 of FIG. 6.

An award type, or category, is defined or assigned at 1010. The award type can be, for example, an indication of whether the award is associated with a wagering game, an award that is randomly awarded other than through a wagering game, or an award that is achieved based on non-random criteria. Among other things, an award type can be used to determine what groups or individuals are eligible for the award, and how an award might be shared in the case that a group wins the award.

Award availability can be defined at 1014. Defining award availability can include specifying whether the award will be made available to both group-based and non-group-based players, or only one category of players. In the event that the award will be available to group-based players, 1014 can also include defining criteria for groups that will be eligible for the award, which can include directly specifying groups that are eligible or specifying properties of eligible groups (for example, whether the group is self-assembled or is associated with a particular employer, a loyalty program, a particular social group (e.g., of a social network), etc.

A value for the award can be specified at 1018. In some cases, the value of the award can vary over time, such as based on game play (wagering or non-wagering), transactions (e.g., purchases), or by those eligible to win the award. Some awards can have values that increase over time. In this case, the award value specified at 1018 can represent a starting value, and how the award increases (increments) over time can be specified at 1022. Ways an award value can increase can include adding an amount to the award value for qualifying wagers, transactions, or other actions by qualifying users. When an award increments, a maximum value for the award can optionally be specified at 1018 or 1022.

Awards can be available until won, or can be provided for a limited time. In addition, awards can be specified as having a time by which they must be awarded. Any such durations (or "good until awarded" criteria) can be specified at 1026. The award definition is stored at 1030.

Example Method for Modifying Group Membership

Figure 11:
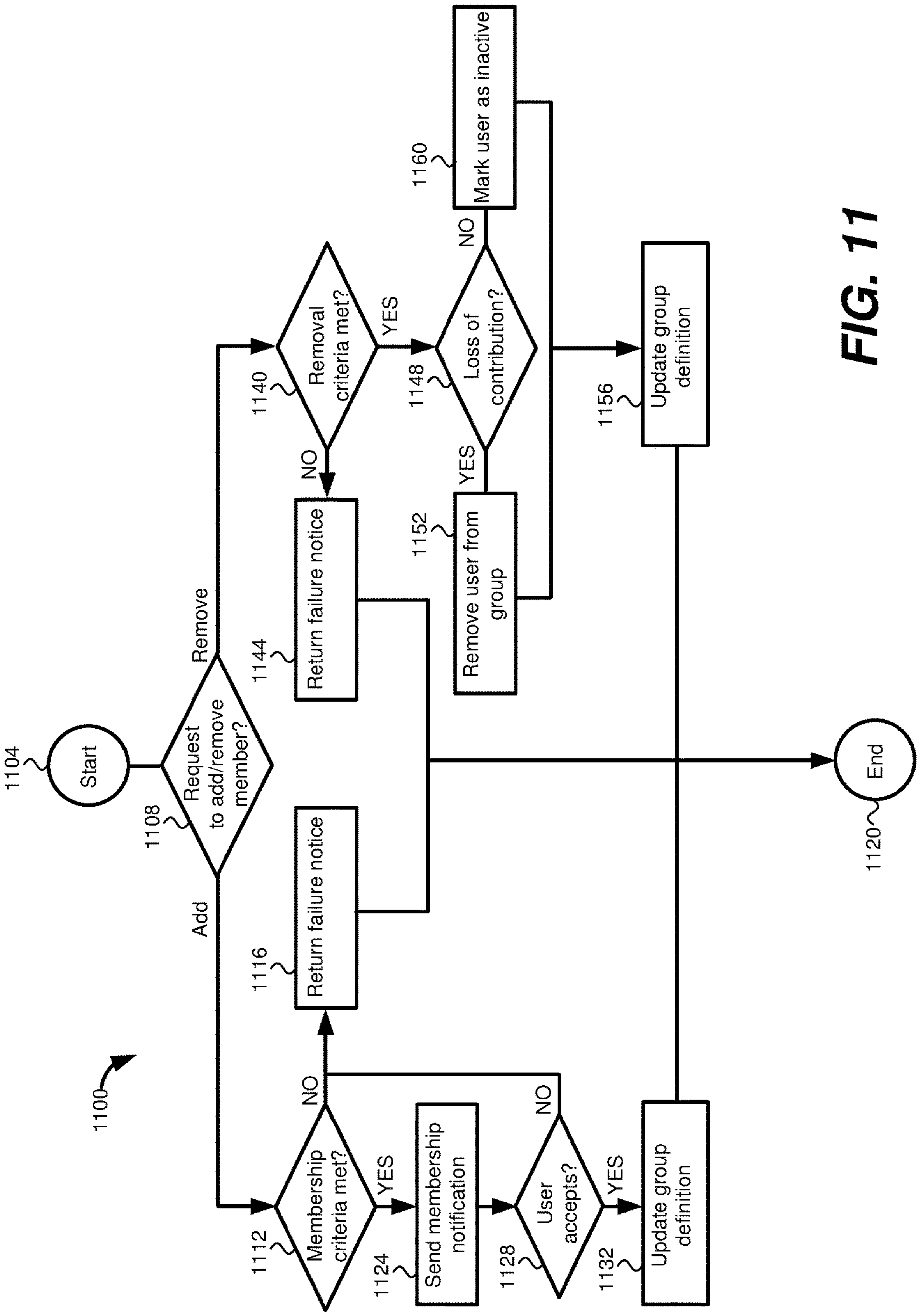
FIG. 11 is a flowchart of an example method for modifying group membership.

FIG. 11 is a flowchart of an example method 1100 for updating a group definition to add or remove a group member. The method 1100 beings at 1104. At 1108, a request is received to add or remove a group member. If the request is to add a group member, the method 1100 proceeds to 1112 where a user profile of the user to be added is analyzed to determine if the user meets membership criteria specified for the group. If not, a failure notice can be returned at 1116 in response to the request, and the method 1100 can end at 1120. Determining whether membership criteria are met can also, or alternatively, include determining whether a profile for the group allows for users to be added to the group, and if a state of the group, including awards available to the group, allows for member addition at the time of the request (e.g., if game play for an award has already started).

If the membership criteria are met, a membership notification can be sent to the user at 1124. It is determined at 1128 whether the user accepts the invitation to join the group. If the user does not accept the invitation, a failure notice can be provided in response to the request at 1116, and the method 1100 ends at 1120. If the user accepts the request, the user can be added to the group and the group definition updated at 1132. 1124 and 1128 can be optional, particularly in cases where there is no detriment (e.g., having to share an individual award with the group) to the user to being added to the group, in which case the method 1100 can end at 1120 after 1112.

If the request is to remove a group member, the method 1100 can proceed to 1140. At 1140, it is determined whether removal criteria have been met. Removal criteria can include determining that a profile for the group allows for member removal, and that the group, including awards associated with the group, are in a state that allows for member removal. If the removal criteria are not met, a failure notice can be returned in response to the request at 1144, and the method 1100 can end at 1120.

If removal criteria are met, it can be determined at 1148 if the user's removal from the group results in the loss of a user's contribution to the group, such as credits wagered by the user being removed or a period of game play time for the user. If it is determined that the user being removed loses their contribution, the user can be removed from the group at 1152. The group definition can be updated at 1156, and stored, to reflect the user's removal from the group. The method 1100 can then end at 1120.

If it is determined at 1148 that the user being removed does not lose their contribution, the user can be marked as inactive at 1160. Marking the user as inactive can cause future actions, such as game play, to no longer be attributable to the group. However, the user is not removed from the group so that they may receive part of any award to the group for which they would have otherwise been qualified to receive. The group definition can be updated at 1156 to reflect the user's inactive status, and then the method 1100 can end at 1120.

Example Method for Conferring an Award

Figure 12:
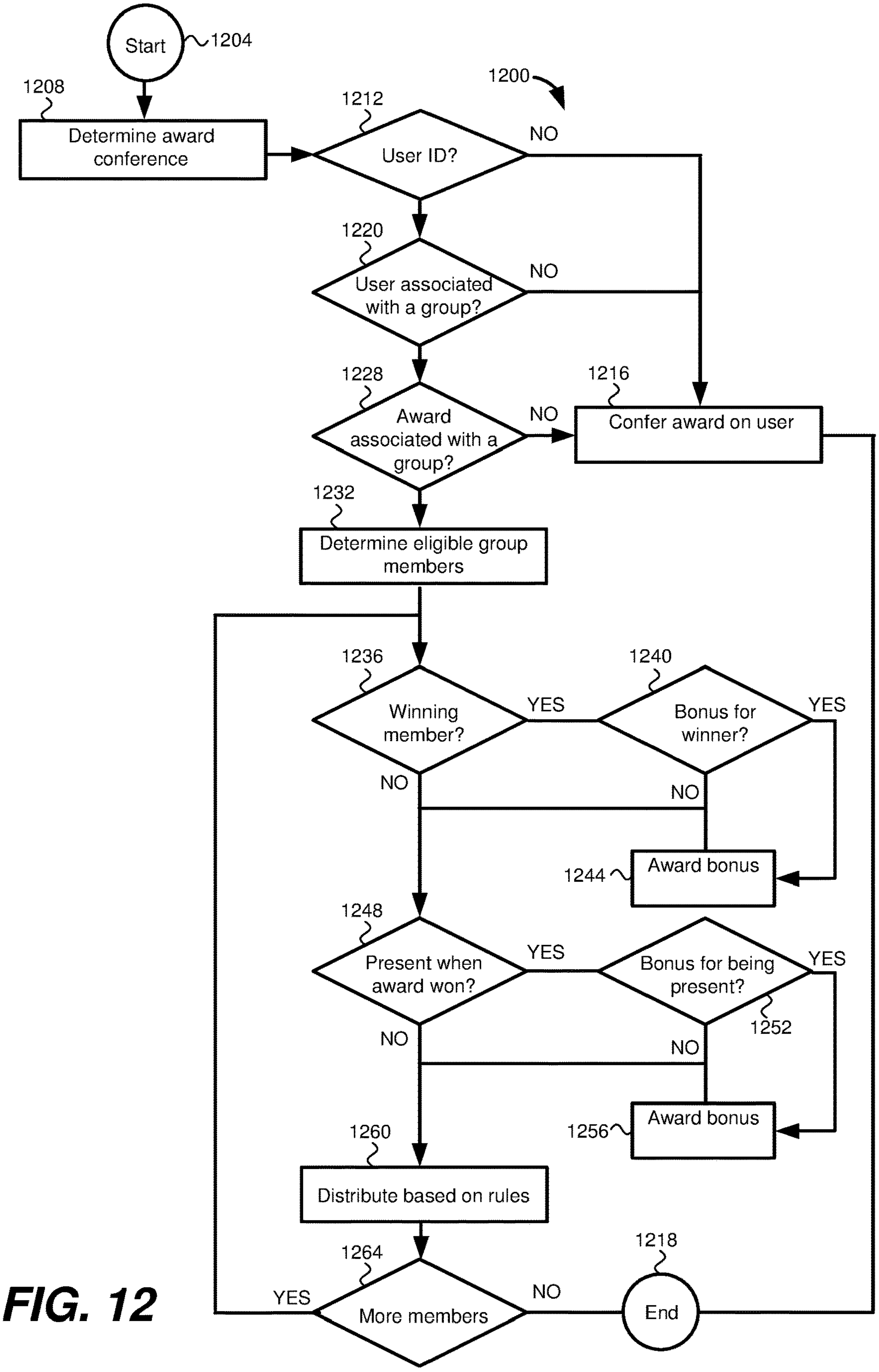
FIG. 12 is a flowchart of an example method for distributing an award that may be associated with group-based users.

FIG. 12 is a flowchart of a method 1200 for conferring an award. The method 1200 can be performed by an EGM, such as an EGM 104A-104X of FIG. 1 or an EGM 200 of FIG. 2. In other implementations, the method 1200 can be performed by a server or controller, such as the central determination gaming system server 106, the player tracking system server 110, the progressive system server 112 (e.g., the VERTEX progressive controller available from Aristocrat® Technologies, Inc.), or the casino management system server 114 of FIG. 1. When the method 1200 is performed by a server or controller, the server or controller can be in communication with a single EGM or can be in communication with a plurality of EGMs. A server or controller can be concurrently in communication with a plurality of EGMs, or can communicate with a plurality of EGMs over time (e.g., EGMs can connect to and disconnect from the controller or server over time).

The method 1200 can begin at 1204. At 1208, it is determined that an outcome of a game, contest, or other activity associated with an award results in the conferring of the award. For example, it can be determined as a result of a call to a random number generator, including a random number generator of a wagering game, that an award is to be conferred. It is determined at 1212 whether the user whose actions resulted in conference of the award is associated with a user ID. If not, the award can be conferred on the user at 1216. The method 1200 can then end at 1218.

If it is determined at 1212 that the user is associated a user ID, it can be determined at 1220 whether the user is associated with a group, at least for purposes of the award being conferred. In some cases, determining whether the user is associated with a group, and with a group for the award, can be carried out by querying a database that stores one or more of user profiles, group profiles, or award profiles (e.g., querying the database using the user ID and optionally an award ID as search criteria). If it is determined at 1220 that the user is not associated with a group, the award can be conferred on the user at 1216 and the method 1200 can end at 1218. Otherwise, the method 1200 proceeds to 1228.

At 1228, the method 1200 determines whether the award is associated with a group. That is, even if a user is associated with a group for some awards, the award being conferred may not be associated with the group, and instead should be conferred solely to the user. If it is determined at 1228 that the award is not associated with a group with which the user is associated, the award can be conferred on the user at 1216. If it is determined at 1228 that the award is associated with a group of which the user is a member, the method 1200 can proceed to 1232.

At 1232, the method 1200 beings a process of determining group members eligible for part of the award and amounts to be conferred on such members. Eligible group members are determined at 1232. Determining eligible group members can include determining members of the group and then determining if a given member meets eligibility criteria, such as having played for a sufficient length of time, wagered a sufficient number of credits, or engaging in a sufficient number of transactions or transactions that satisfy a threshold amount. For a first member of the group, it is determined at 1236 whether the member is a winning member, a member whose actions resulted in conference of the award.

If it is determined at 1236 the member is the winning member, it can be determined at 1240 if rules for the group and award indicate that the winning member should receive a bonus or additional portion of the award. If so, the additional amount can be awarded to the member at 1244. After providing any additional award amount to the winning user at 1244, or if it is determined at 1240 that no bonus is provided to a winning member, or if it is determined that the member is not the winning member, the method 1200 proceeds to 1248.

At 1248, it is determined whether the group member was present, such as being carded into a player tracking system, when the award was conferred on the winning member. If so, the method 1200 proceeds to 1252, where it is determined whether a bonus or additional portion of the award is provided to users present at award conference. If a bonus or additional amount is provided for being present, the additional amount can be awarded to the member at 1256. After providing any additional award amount to the winning user at 1256, if it determined at 1252 that no additional amount is provided to group members present at award conferral, or if it was determined at 1248 that the group member was not present, the method 1200 proceeds to 1260.

At 1260, a portion of the award is conferred upon the member being analyzed, according to a sharing schema defined for the group and award. For example, a portion of the award proportional to the time played or credits wagered by the member can be conferred on the member. The method 1200 then proceeds to 1264 to determine if any more group members remain to be processed. If so, the method returns to 1236. Otherwise, the method 1200 ends at 1218.

Example Increase of Award Value Based on Non-Gaming Transactions

Figure 13:
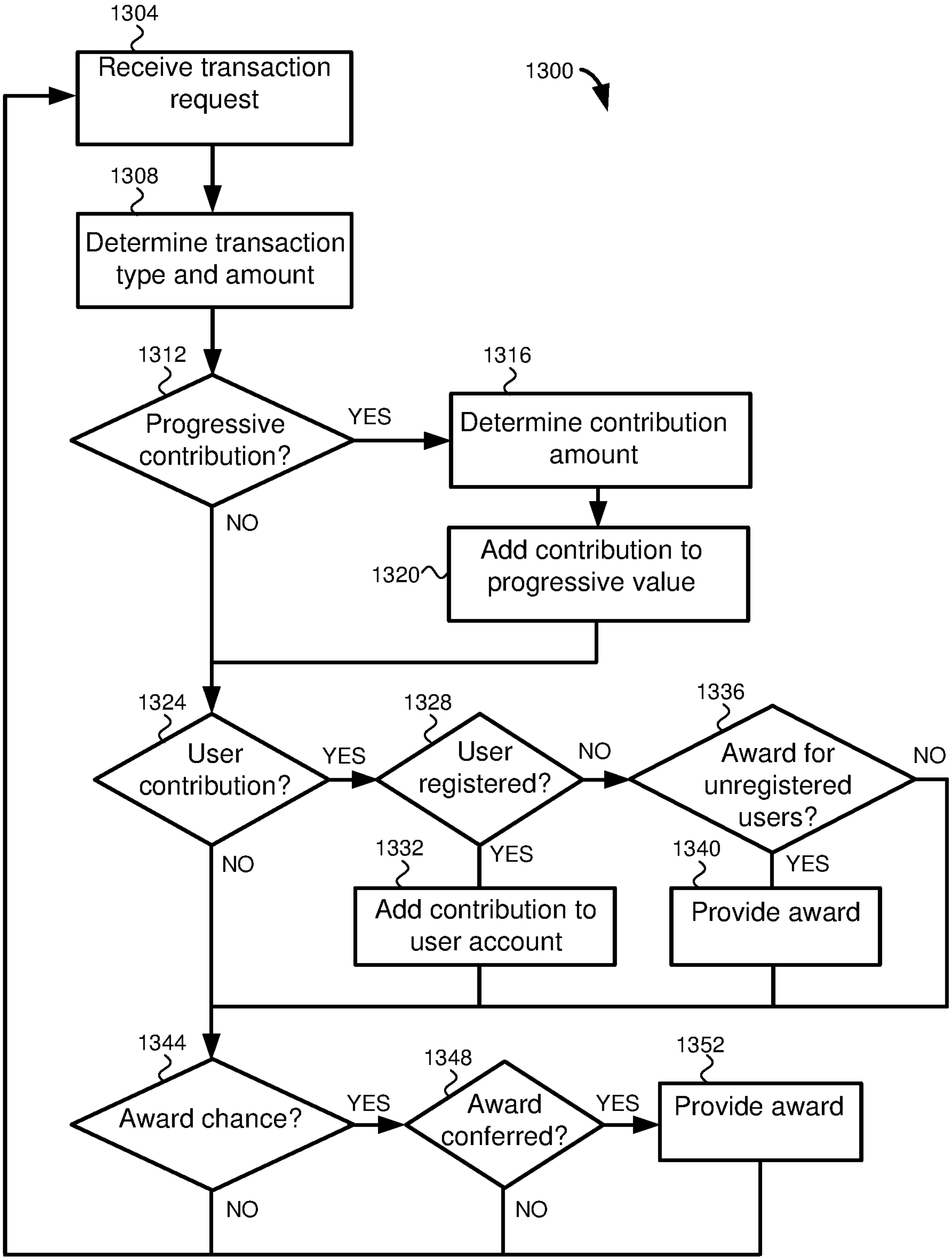
FIG. 13 is a flowchart of an example method for determining whether a transaction may increase an award amount or provide a chance to win an award.

An amount of an award associated with a wagering game can be increased based on non-wagering game activity, such as the purchases of goods or services at a gaming establishment. In addition, a chance to win an award, which can be associated with a wagering game or separate from a wagering game, can be provided for activity other than game play on a wagering game. For example, the purchase of goods or services at a gaming establishment can be associated with a chance to win an award. FIG. 13 is a flowchart of an example method 1300 where contributions to an award can be made for non-wagering game activity and where such activity can be associated with a chance to win an award. Although both these aspects are shown in the method 1300, other methods can include one of the features (award contribution or award chance), but not both. These methods can otherwise be analogous, relevant portions of the method 1300.

A transaction request is received at 1304. The transaction request can be a request to purchase goods or services from an establishment that is associated with the method 1300. For example, point of sale terminals or websites that are associated with the method 1300 can include functionality for sending a transaction notification that is then received at 1304. In a specific example, the transaction request is sent to a user tracking system, such as the user tracking system 716 of FIG. 7. A transaction request can include information such as a time of the transaction, an amount of the transaction, a type of the transaction, or an identifier of a user associated with the transaction.

A transaction type and amount for the transaction are determined at 1308. Determining a transaction type can include determining a type of good or service being purchased. At 1312 it is determined whether the transaction is associated with a progressive contribution, where a progressive contribution can be used to increase the amount of an award, which can be an award for a wagering game or a non-wagering game award. Determining whether the transaction is associated with a progressive contribution can include determining whether the user associated with the transaction is associated with an award that governed at least in part by the method 1300, and can include determining whether the user is associated with a group, and whether the award is group-based award. Determining whether the transaction is associated with a progressive contribution can, alternatively or additionally, include determining whether the transaction type and/or amount are associated with an award that is governed at least in part by the method 1300, such as whether the amount satisfies a threshold set for a progressive contribution.

If it is determined at 1312 that the transaction is associated with a progressive contribution, an amount of the progressive contribution can be determined at 1316. Progressive contributions can be fixed, such as contributing a set amount when a qualifying transaction is received, or can be correlated to a particular type or amount of a transaction. That is, some transaction types might be favored, and so a larger contribution to the progressive amount might be made when such a transaction takes place. Similarly, it may be desirable to increase a contribution amount as the amount of the transaction increases. The contribution is added to the progressive value at 1320.

After adding the progressive contribution to the progressive amount at 1320, or if was determined at 1312 that the transaction is not associated with a progressive contribution, the method 1300 proceeds to 1324. At 1324 it is determined if the transaction is associated with a contribution to a user account. That is, in some cases a user may be given an award based on transactions made by the user. For example, if a user makes a qualifying transaction, credits may be added to a user's account balance for a player loyalty program, where the credits can be used for game play on a wagering game or can be redeemed for goods or services.

Determining whether the transaction is associated with a user contribution at 1324 can be carried out in a similar manner as determining whether a transaction is associated with a progressive contribution at 1312. It can be determined whether the transaction type provides for a contribution to a user account and/or whether a transaction amount satisfies a threshold amount. User information sent with the transaction (e.g., a user identifier for a player tracking system, a credit card number, or other identifying information) can also be used to determine whether that particular user is eligible for a user contribution.

If it is determined at 1324 that a contribution is to be made to a user account, it can be determined at 1328 whether the user is a registered user, such as being a user having an account to which credits or other awards can be added. If so, the contribution can be added to the user's account at 1332. Note that the method 1300 can also include determining at 1328 whether the user is associated with a group, and whether the user contribution is associated with a group such that at least a portion of the award should be conferred on other group members. If so, 1332 can include determining amounts to be conferred on group members, which can be analogous to the method 1200 of FIG. 12.

If it is determined at 1328 that the user is not a registered user, it can be determined at 1336 whether an award may be conferred upon unregistered users for qualifying transactions. Even in the absence of a user account, a user can be provided with free goods or services, including in the form of gift cards or monetary awards. If awards are conferred to unregistered players, the award can be provided at 1340. If it determined at 1336 that awards are not provided to unregistered users, the method 1300 proceeds to 1344.

At 1344, it is determined whether a transaction is associated with a chance to win an award. If so, it is determined at 1348 whether an award will be conferred for the transaction. Determining whether an award will be conferred for a transaction can include making a call to a random number generator and using a lookup table to determine whether the result is associated with conferral of an award. If it is determined at 1348 that an award is to be conferred, the award is conferred at 1352. If it is determined at 1348 that an award is not conferred, or determined at 1344 that the transaction is not associated with an award chance, the method 1300 returns to 1304.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

an electronic gaming machine configured to present a game, the electronic gaming machine comprising a display device configured to display a user interface; and a server in communication with a plurality of electronic gaming machines including the electronic gaming machine;

at least one processor in communication with the server;

computer-executable instructions that, when executed by the at least one processor, cause the electronic gaming system to perform operations comprising:

storing a plurality of user profiles in a database, each of the plurality of user profiles including a group membership data field configured to store a group identifier;

in response to receiving information via a user interface of the electronic gaming machine from a first player associated with a first user profile including a first group identifier, querying the database based on the group membership data field to identify a first group of players, the first group of players each having a user profile including the group identifier;

receiving a first selection to participate in a game instance of the game from the first player via the user interface of the electronic gaming machine, wherein the first selection is associated with game play of the game that provides a chance to receive at least a first award;

receiving second selections to participate in the game instance of the game, the second selections received from a second plurality of players not associated with the first group of players, wherein the second selections are associated with game play of the game that provides a chance to be awarded the at least a first award associated with the game instance selected by the first player;

determining that a game outcome for the game instance of the game associated with the first player comprises the at least a first award; and distributing the at least a first award to each player of the first group of players.

2. The electronic gaming system of claim 1, wherein the at least a first award comprises a jackpot.

3. The electronic gaming system of claim 1, wherein the at least a first award comprises a progressive jackpot.

4. The electronic gaming system of claim 1, the operations further comprising:

receiving a transaction, the transaction comprising a value, wherein the transaction is not a wager associated with a game instance of the game; and increasing a value of at least a second award in response to the receiving the transaction.

5. The electronic gaming system of claim 4, wherein the at least a second award is the at least a first award.

6. The electronic gaming system of claim 4, wherein the at least a second award is different than the at least a first award and is not available to be awarded to the second plurality of players.

7. The electronic gaming system of claim 4, wherein the at least a second award is not awarded in response to game play on the game.

8. The electronic gaming system of claim 7, the operations further comprising:

randomly determining at least one player of the first group of players to receive at least a portion of the at least a second award; and awarding the at least a portion of the second award to the at least one player.

9. The electronic gaming system of claim 4, wherein the transaction is associated with a location identifier and the operations further comprise:

determining that the location identifier is associated with a rule specifying a contribution to the at least a second award.

10. The electronic gaming system of claim 4, wherein the increasing of the value is based at least in part on the value of the transaction.

11. The electronic gaming system of claim 4, wherein the increasing of the value is not based on the value of the transaction or on wagers placed on the game.

12. The electronic gaming system of claim 1, the operations further comprising receiving a transaction, the transaction comprising a value and a user identifier, wherein the transaction is not a wager associated with a game instance of the game;

determining that the user identifier identifies a user profile of the first group of players; and increasing the value of an award available to the first group of players, but not to the second plurality of players, in response to the receiving the transaction.

13. The electronic gaming system of claim 1, wherein distributing the at least a first award to each player of the first group of players comprises:

determining an amount wagered by each of the first group of players; and distributing at least a portion of the at least a first award to a given player of the first group of players commensurate with the amount wagered by the given player.

14. The electronic gaming system of claim 13, wherein determining an amount wagered by each of the first group of players comprises determining wager amounts that satisfy a threshold wager level and the distributing is commensurate with the wager amounts that satisfy the threshold wager level.

15. The electronic gaming system of claim 1, the operations further comprising:

awarding one or more points to at least a portion of the first group of players based at least in part on wagers associated with the first selections submitted by respective players of the first group of players;

determining a total number of points for the at least a portion of the first group of players; and distributing at least a portion of the at least a first award to a given player of the first group of players commensurate with the total number of points wagered by the given player.

16. The electronic gaming system of claim 1, the operations further comprising:

subsequent to making the at least a first award available to be awarded, but prior to awarding the at least a first award:

adding at least one user profile to the first group of players by adding the first group identifier to the group membership data field of the at least one user profile; or removing at least user profile from the first group of players by removing the first group identifier to the group membership data field of the at least one user profile.

17. The electronic gaming system of claim 16, wherein at least one user profile is removed from the first group of players in response to failing to satisfy a threshold wager level.

18. The electronic gaming system of claim 1, the operations further comprising:

defining the first group of players, the defining comprising:

defining membership criteria for the first group of players;

analyzing player information for a third plurality of players; and adding to the first group of players, players of the third plurality of players whose player information satisfies the membership criteria.

19. The electronic gaming system of claim 1, wherein an amount distributed to the first player is increased based at least in part on the first player achieving the game outcome.

20. The electronic gaming system of claim 1, the operations further comprising:

receiving third selections to participate in the game instance of the game, the third selections associated with a second group of players, wherein (1) the third selections are associated with game play of the game that provides a chance to receive the at least a first award; and (2) at least a portion of players of the second group of players is different than players of the first group of players;

wherein a second player of the first group of players is a member of the second group of players.

* * * * *